United States Patent [19]

Slater et al.

[11] 4,413,314

[45] Nov. 1, 1983

[54] INDUSTRIAL PROCESS CONTROL SYSTEM

[75] Inventors: Billy R. Slater, Plano; Dennis W. Simpson, Carrollton, both of Tex.; Clarence T. Carroll, Middletown, N.J.

[73] Assignee: Forney Engineering Company, Addison, Tex.

[21] Appl. No.: 255,842

[22] Filed: Apr. 20, 1981

Related U.S. Application Data

[62] Division of Ser. No. 159,599, Jun. 16, 1980.

[51] Int. Cl.³ ...................... G06F 15/46; G06F 3/153
[52] U.S. Cl. .................................... 364/188; 340/706; 340/722; 364/138
[58] Field of Search ............... 364/138, 188, 189, 146, 364/147, 171, 190; 340/706, 707, 708, 712, 722

[56] References Cited

U.S. PATENT DOCUMENTS 3,474,438 10/1969 Lauher ............................ 340/722 X
3,898,643 8/1975 Ettlinger ......................... 340/707 X
4,001,807 1/1977 Dallimonti ..................... 340/722 X
4,121,204 10/1978 Welch et al. ............... 340/365 C X
4,122,438 10/1978 Bird ................................. 340/707 X
4,238,792 12/1980 Cohen et al. ......................... 340/707

FOREIGN PATENT DOCUMENTS 1097094 12/1967 United Kingdom ................ 364/188

OTHER PUBLICATIONS

McMorris et al., "Are Process Control Rooms Obsolete", Control Engineering, Jul. 1971–pp. 42–48.

Full page advertisement opposite p. 101 in Feb. 20, 1980 issue of U.S. News & World Report.

Primary Examiner—Joseph F. Ruggiero
Attorney, Agent, or Firm—Marvin A. Naigur; John E. Wilson; Richard L. Aitken

[57] ABSTRACT

An industrial process control system in accordance with the present invention includes a plurality of device controllers connected together through a common buss with each device controller connected to an associated controlled device(s) that effect process control. A computer-aided system interface for controlling the overall system includes a visual display device in the form of a multi-color CRT and a graphic input device in the form of a transparent touch-responsive panel that overlies the CRT display screen. Computer generated symbols representing the controlled devices are displayed on the CRT screen to define touch-responsive target areas. When an appropriate target area is touched by a human operator, a signal, such as a command signal, is generated to cause the controlled device whose symbol is displayed in the designated target area to respond, with this response being then indicated by a change in the device symbol being displayed on the screen. Other features include generation of a "hit" display to indicate the last coordinates on the display screen touched by the operator, a two-step execute command sequence for entering high priority commands into the system, and the changing of analog set point values as a function of the time that a selected target area is touched. The system advantageously eliminates some, if not all, input through a conventional keyboard so that the system operator interfaces with the system through easily comprehended and non-ambiguous visual symbols.

6 Claims, 17 Drawing Figures

[INDEX] [ALARMS] [ALT] [CLEAR] [PAGE] [BACK] [ALM SUM] [RETURN] [COPY] [EXE]

TIME:
DATE:

FIG. 7.

INDEX

| AREA | PLANT OVERVIEW | PROCESS GRAPHIC | LOGS | AREA SUMMARY |
|---|---|---|---|---|
| PLANT | ☐ | ☐ | ☐ | ☐ |
| BURNER | ☐ | ☐ | ☐ | ☐ |
| DESULFUR | ☐ | ☐ | ☐ | ☐ |

CHART RECORD SEL ☐    VIDEO TREND GROUPS ☐

SYSTEM CONFIG. ☐    REMOTE STATUS ☐

ENTER TIME ☐    VIDEO TREND ☐

ENTER DATE ☐

[INDEX] [ALARMS] [ALT] [CLEAR] [PAGE] [BACK] [ALM SUM] [RETURN] [COPY] [EXE]

FIG. 8.

INDEX

CONVERGE ☐

SYMBOLS ☐

PATTERN ☐

|INDEX| |ALARMS| |ALT| |CLEAR| |PAGE| |BACK| |ALM SUM| |RETURN| |COPY| |EXE|

FIG. 9.

| G1 G2 G3 G4 G5 G6 G7 G8 | G1 — · — · — G8 | G1 — · — · — G8 | CT — · — · — G8 |
|---|---|---|---|
| LABEL-1 | LABEL-2 | LABEL-3 | LABEL-4 |

|INDEX| |ALARMS| |ALT| |CLEAR| |PAGE| |BACK| |ALM SUM| |RETURN| |COPY| |EXE|

AREA SUMMARY

| | | | |
|---|---|---|---|
| PID-TIC104 | BURNER TEMP | 0.00 | DEGF |
| PID-PIC128 | FUEL OIL PRESS | 0.00 | PSIG |
| PID-PIC123 | FUEL GAS PRESS | 0.00 | PSIG |
| PID-PIC130 | ATOMIZING STEAM PRESS | 0.00 | PSIG |
| AI-LT116SL | LT-116 SEC SEP LVL | 0.00 | Z |
| AI-PT115GP | PT-115 OFF GAS PRESS | 0.00 | PSIG |
| AI-TT113CT | TT-113 EFF COOLER TEMP | 0.00 | DEGF |
| AI-PT130SP | PT-130 ATOM STM PRESS | 0.00 | PSIG |

[INDEX] [ALARMS] [ALT] [CLEAR] [PAGE] [BACK] [ALM SUM] [RETURN] [COPY] [EXE]

FIG. 15.

ALARM SUMMARY

TIME    DATE

| | | | |
|---|---|---|---|
| AI-PT123GP | PT-123 FUEL GAS PRESS | 0.00 | PSIG |
| M 56.18 | WASTE FUEL PRESS LO-LO | | |
| M 56.8 | XV-134D FAILURE | | |
| PID-PIC139 | ATOMIZING STEAM PRESS | 0.00 | PSIG |
| M 56.2 | XV-122 FAILURE | | |
| PID-PIC115 | OFF GAS PRESSURE | 0.00 | PSIG |
| M 56.13 | REACTOR CHARGE PUMP FAIL | | |

[INDEX] [ALARMS] [ALT] [CLEAR] [PAGE] [BACK] [ALM SUM] [RETURN] [COPY] [EXE]

ND SYSTEM

INDUSTRIAL PROCESS CONTROL SYSTEM

BACKGROUND OF THE INVENTION

This application is a division of application Ser. No. 159,599 filed June 16, 1980.

The present invention relates to a computer controlled system for an industrial process and, more particularly, to a computer controlled system for an industrial process in which interactive control by a human operator is achieved through a touch-responsive visual display.

Many system-type industrial installations, for example, those related to industrial process-type manufacturing and electrical power generation, employ a larger number of physically distributed controlled devices and associated sensors for effecting coordinated operation of the overall system. In the past, coordinated control of the various devices has been achieved by manual operation and various types of semi-automatic and fully automatic control systems including electromagnetic relay systems, hard-wired solid-state logic systems, and various types of computer controlled systems. The computer systems have included central systems in which a central computer, distributed control systems in which a remotely located computer is connected to each of the controlled devices and to one another, and hybrid system combinations of the central and distributed systems.

In the computer-type control system, the man/machine interface has been typically accomplished with a cathode ray tube (CRT) visual display device in combination with a standardized keyboard. To effect the entry of a command, the system operator usually must enter a code, such as an alpha-numeric acronym or mnemonic, and then enter another code for the command to effect the requested information display, change in the operation of the controlled device, and/or change the set point of a system parameter. Because the entry of this type of information requires correct depression of a sequence of key pads, keyboard entry of commands is dependent upon the skill of the system operator and is, of course, subject to error. The error rate inherent in this type of information and command entry has been recognized in the art and has given rise to often sophisticated entry verification programs by which an invalid entry will be recognized and an appropriate "invalid message" will be displayed to permit the operator to re-enter the message in correct form. While these types of validity checking programs are effective for the detection of mis-struck key pads in making alpha-numeric acronym or mnemonic entries, they are of no assistance when the system operator correctly enters an unintended mnemonic, e.g., when the operator intends to change the operational state of a pump but absentmindedly enters the correct mnemonic for a change in the operation of a compressor. The entry validity checking program will usually not detect this type of error.

SUMMARY OF THE INVENTION

In view of the above, it is an overall object of the present invention, among others, to provide an industrial process control system in which system commands can be easily and reliably entered.

It is another object of the present invention to provide an industrial process control system in which commands and other information can be entered with a minimum error rate.

It is still another object of the present invention to provide an industrial process control system in which the system operator can enter commands and other instructions to cause a change in the process in which a visual perception of the controlled device by the system operator and the command entry step are substantially related to one another to minimize errors.

It is still another object of the present invention to provide an industrial process control system in which the system operator can enter commands and the like to cause a change in the operational state of a controlled device in which a visually displayed symbol of the controlled device is spatially juxtaposed with a touch-responsive means so that touching of the visually displayed symbol will also effect command entry into the system with the commanded response of the controlled device then causing a change in the visually displayed symbol of the controlled device.

An industrial process in accordance with the present invention includes a plurality of process control devices each connected for control thereof to an associated device controller. A common communications buss interconnects the device controllers with a command and information interface means to permit communication therebetween. The command and information interface is provided for entering commands, requests, information, and the like into the system and includes a visual display device such as a cathode ray tube (CRT) and a computer means for generating alpha-numeric characters for information display and pictorial symbols which graphically represent the controlled devices of the process. The displayed symbols can include graphical representations of push buttons as well as more definite symbols such as a graphical representation of a pump or the like. A transparent or otherwise light transmitting touch-responsive panel overlies the CRT screen so that the CRT display surface will be in substantial registration with the touch-responsive panel. Systems commands, including sequential-type commands as well as analog-type commands, are entered by manually touching an area of the touch-responsive screen in which a symbol appears. Upon entry of the command, the displayed symbol then changes in a selected manner, e.g., the color of the displayed symbol is changed, to indicate that the controlled device has responded in the input command. Other features of the invention include the display of a "hit" indicia to indicate the last position touched by the operator on the screen, a two-step entry procedure for inputting high priority control signals to guard against error, and a procedure for changing the set point of a system parameter as a function of the time that a selected target area is touched.

The industrial process control system in accordance with the present invention advantageously permits a system operator to enter commands, requests, display information, and the like in a manner by which the touch-responsive command entry area is in spatial registration or juxtaposition with a visual symbol of the controlled device to which the command pertains. In this way, commands and the like can be easily entered with a low error rate. The need for entry through a keyboard is minimized and may be eliminated in some applications to provide efficient, high-level system control. The possibility of mis-strike on the screen is greatly reduced when compared to the possibility of mis-strike in conventional keyboard entry systems.

DESCRIPTION OF THE FIGURES

The above description, as well as the objects, features, and advantages of the present invention will be more fully appreciated by reference to the following detailed description of a presently preferred but nonetheless illustrative embodiment in accordance with the present invention when taken in conjunction with the accompanying drawings wherein.

DESCRIPTION OF THE PREFERRED EMBODIMENT

Figure 1:
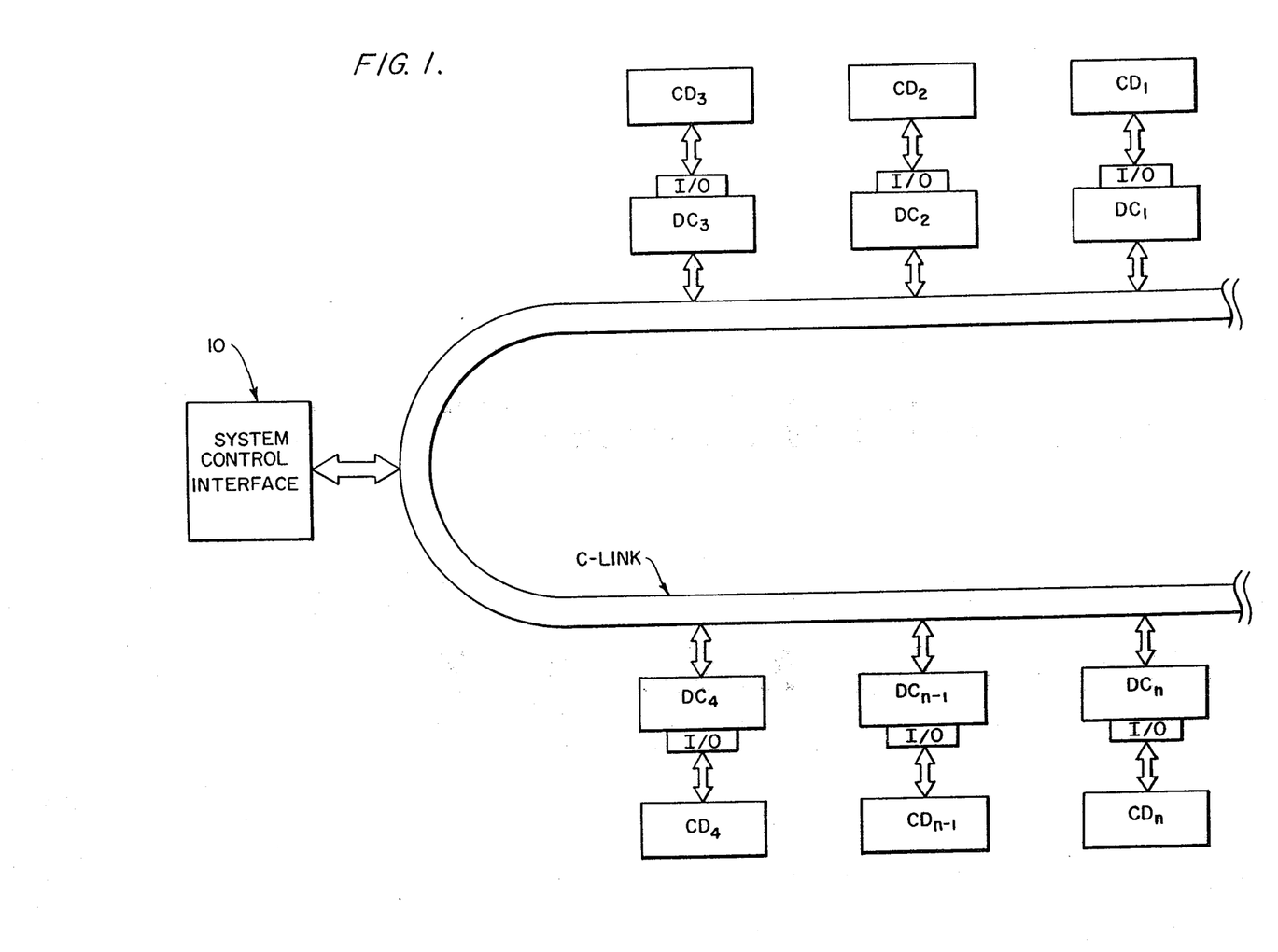
FIG. 1 is an overall system view, in schematic form, of a control system for controlling an industrial process in accordance with the present invention.

An industrial control system in accordance with the present invention is shown in schematic form in FIG. 1 and includes a communications link CL having a plurality of remotely located device controllers $DC_1$, $DC_2$, $DC_3$, ... $DC_{n-1}$, $DC_n$ connected thereto with each of the device controllers $DC_n$ connected to one or more associated or corresponding controlled devices $CD_1$, $CD_2$, $CD_3$, ... $CD_{n-1}$, $CD_n$ such as, but not limited to, various types of parameter sensors (temperature, position pressure, and motion sensors, etc.) and various types of controlled devices motors, pumps, compresors, valves, solenoids, and relays, etc.). A system controlling interface 10 is also connected to the communications link CL and provides a means by which signals (including information and control signals) may be extracted from or entered into the process control system. The system configuration shown in FIG. 1 is a distributed open loop or shared global buss-type; however, the invention is equally suitable for application to central systems and central/distributed hybrid configurations. The system of FIG. 1 is adapted for use in controlling an industrial process, e.g., the operation of an electrical power generation plant.

Figure 2:
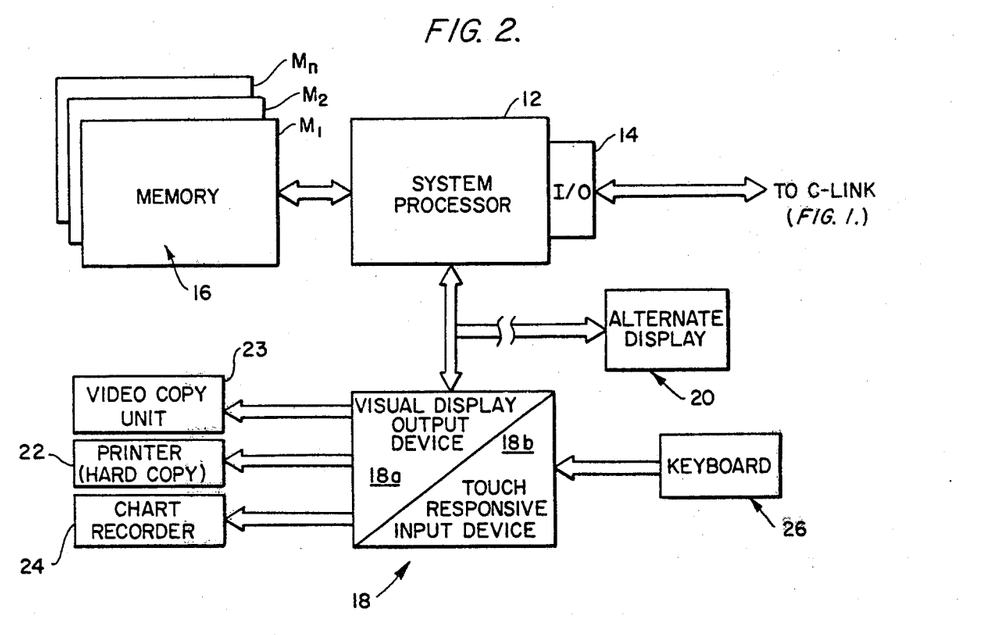
FIG. 2 is a diagram, in schematic block form, of an input/output interface for the system shown in FIG. 1.

The organization of an exemplary system control interface 10 is shown in FIG. 2 and includes a system processor 12 connected to the communications link CL through an appropriate input/output interface 14 and a memory 16 connected to the system processor 12. The memory 16 includes plural memory files $M_1$, $M_2$, ... $M_n$ which contain appropriate instruction sets and stored data for use in controlling the system operation. A combined video output and tactile input device 18 is connected to the system processor 12 and functions as a man/machine interface as described more fully below with at least one auxiliary or alternate visual display device 20 also connected to the system processor 12. A printer 22 is connected to the visual output and tactile input device 18 to provide a hard copy of alpha-numeric information or data such as alarm status information and a video copy unit 23 is also connected to the visual output and tactile input device 18 for providing a hard copy of the current video display. In a similar manner, a chart recorder 24 is provided for obtaining a graphical output of a parameter(s) with respect to time. In addition, a keyboard 26 is provided for auxiliary input of alpha-numeric data as described below.

Figure 3:
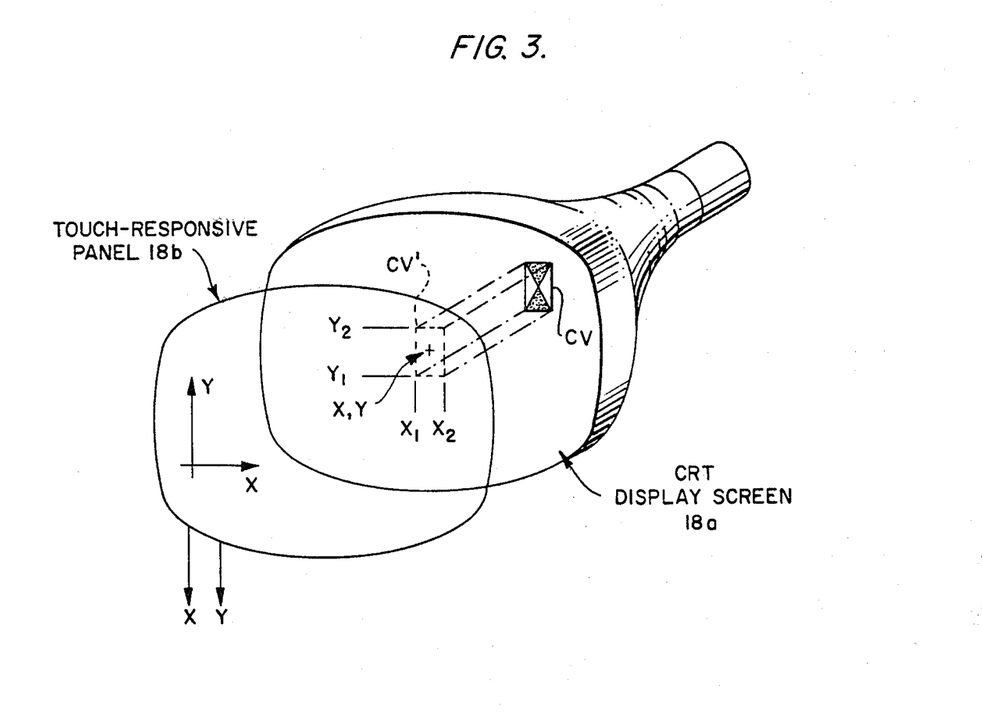
FIG. 3 is a pictorial perspective of a cathode ray tube display device with a light-transmitting touch-responsive panel overlying the screen of the CRT, the touch-responsive panel being spaced somewhat from the display screen of the CRT for purposes of clarity.

The video display output and tactile input device 18 is shown in pictorial form in FIG. 3 and includes a cathode ray tube (CRT) having a conventional display screen 18a or surface and a touch-responsive panel 18b that overlies the display screen. While not specifically shown in FIG. 3, the CRT is connected to the necessary structure and circuitry for the generation of full-color displays as described more fully below. The touch-responsive device 18b preferably takes the form of a light transmitting (preferably transparent) panel that is placed over and overlies the display screen 18a of the CRT and conforms closely to the display surface of the CRT. The touch-responsive panel 18b, for example, may be a flexible, transparent sheet-like panel fabricated from an insulating material such as Mylar with a light-transmitting conductive coating deposited thereon of uniform resistivity. Plural electrodes (not shown) are deposited or otherwise formed along the horizontal and vertical edges of the touch-responsive panel and connected to a power supply(s) to develop perpendicular electric fields across the conductive coating so that when a surface portion thereof is touched by a human operator, a signal is derived from the various electrodes which can be decoded or otherwise discriminated to provide the coordinates (X,Y) of the touched area. The touch-responsive panel may also take the form of a plurality of spaced parallel conductive traces arranged in columns and perpendicular rows with these rows and columns separated by a suitably apertured dielectric media to define a directcontact switch matrix. The various rows and columns may be sequentially and synchronously scanned and electrical contact between a row(s) and a column(s) detected as a touch and these contact areas when correlated with the scanning information, providing the coordinates (X,Y,Z) that indicate the location of the touched area on the display. For example, as shown in FIG. 3, the symbol of a control valve CV can be graphically represented on the CRT screen. The symbol CV occupies a corresponding surface area CV' of the touch-responsive panel 18b with this area being identified along the X-axis (abscissa) between the coordinates $x_1$ and $x_2$ and along the Y-axis (ordinate) between the coordinates $y_1$, and $y_2$. Thus, if a human operator touches the touch-responsive panel 18b at a position (X,Y) within the control valve CV' "target" area (that is, $x_1 < X < x_2$ and $y_1 < Y < y_2$), the touch or "hit" will be within the area defined by the symbolically represented control valve CV. As explained in more detail below, this coordinate information (X,Y) can be employed by the system processor 12 to provide command inputs to the system to effect a change in the control valve operation.

In the preferred embodiment, the system of FIGS. 1-3 can be utilized to permit the system operator to call-up selected displays as well as effect control of the system. The manner in which the system can be used for display call-up can be appreciated from a consideration of the system architecture shown in FIG. 4. When an area of the touch-responsive panel 18a (X,Y) that corresponds to a predetermined graphical display is contacted, the coordinates of the "hit" are formatted at 28 and inputted to the display processor 30 which, in the case of the preferred embodiment, is an Intel 8086 microprocessor with an associated clock 32 and support integrated circuits (not shown). The processor 30, operating under the control of an instruction set 34 that evaluates the touched target, assesses the formatted X, Y coordinate information to provide a X, Y display-label look-up pointer, symbolically represented at 36. The pointer 36 is used to designate or address the X, Y display-label table 38 which then provides an address (e.g., "INDEX") to the display look-up table 40. The so-addressed display sub-routine (i.e., "INDEX") is then provided to a display generator 42 which generates the called-up display. In addition, a "HIT" indicator display generator 44 uses the formatted coordinate information (X,Y) to generate a small cross symbol "+" so that the system operator(s) will always be informed of the last target area touched.

Figure 6:
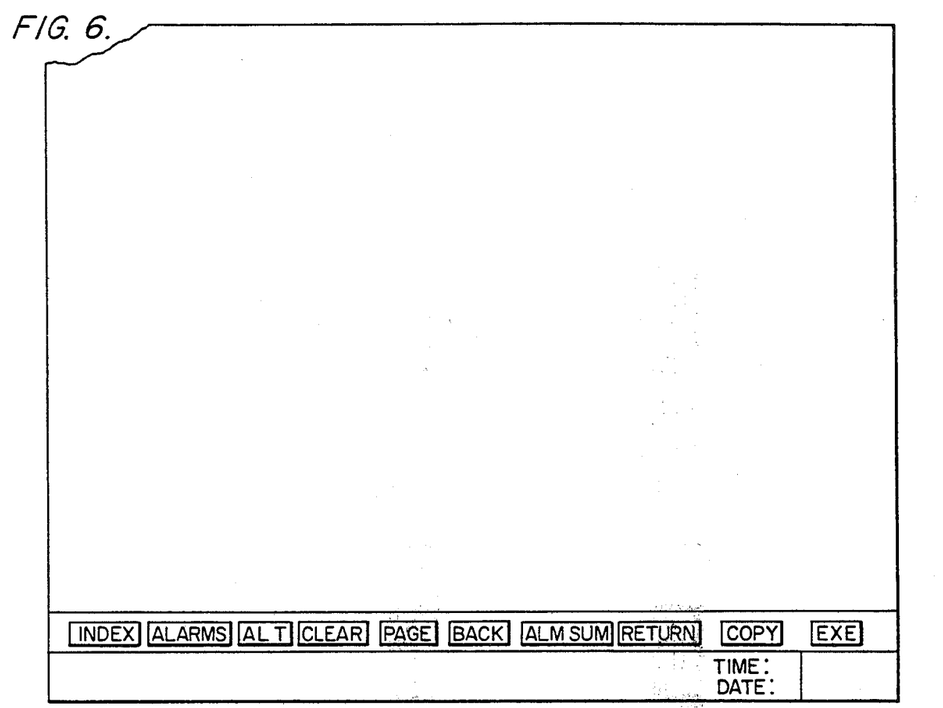
FIG. 6 is a pictorial representation of a global display portion of an overall display.

An exemplary process for control by the industrial process control system of FIG. 1 involves the removal of sulfur from sulfur-containing fuel oil prior to using the so-treated oil to fire a conventional steam generator; it being understood the described process is merely representative. Selected overall displays associated with this process and suitable for use in demonstrating the present invention are shown in FIGS. 6-12. Each overall display includes two portions: a lower global display portion and an upper task-specific portion. FIG. 6 illustrates the global display, which is common to all of the displays, and shows a horizontal row of hollow, labelled target rectangles for effecting an input into the system. Exemplary touch-responsive rectangles include "INDEX," "ALARMS," "ALT" (an abbreviation for 'alternate'), "CLEAR," "PAGE," "BACK," "ALM SUM" (an abbreviation for 'alarm summary'), "RETURN," "COPY," and "EXE" (an abbreviation for 'execute').

The "INDEX" target is used to call-up the first page of a multi-page 'index' file; the "ALARMS" target is used to acknowledge all unacknowledged alarms on a currently displayed page of the 'alarm summary' file (described in more detail below) the "ALT" target is used to control the alternate display 20 of FIG. 2; the "CLEAR" target is used to clear (that is, remove) the current display on the screen; the "PAGE" target is used to increment by one the page of the currently displayed file; the "BACK" target is used to decrement by one the page of the currently displayed file; the "ALM SUM" target is used to call-up the first page of the 'alarm summary'file; the "RETURN" target is used to return the display to the first page of the last successive display from an "N" deep display stack; the "CPY" target is used to actuate the printer 22 of FIG. 2 to provide a hard copy of the display; and the "EXE" target is used in the entry of two-step commands as described more fully below.

Of the above target areas of the global display, the "INDEX," "ALARMS," "ALM SUM," "ALT," and the "EXE" targets are discussed more fully below in connection with the various task-specific displays.

Figure 4:
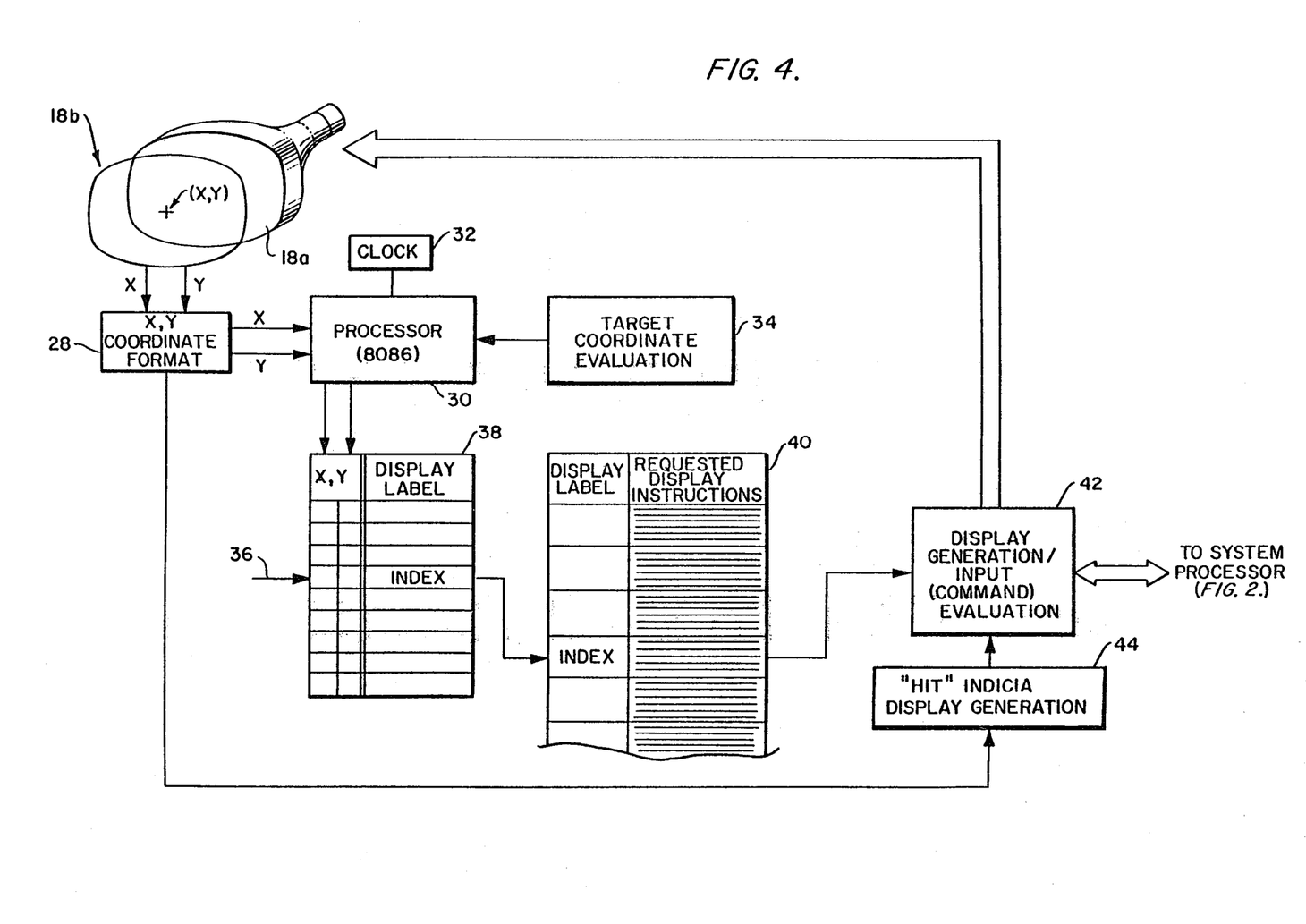
FIG. 4 is a schematic representation of the organization of the display generation portion of the input/output interface shown in FIG. 2.

Touching the "INDEX" target of the global display causes formatted coordinate information (X,Y) indentifying the touched area to be provided to the system processor 30 of FIG. 4. These coordinates are then used to generate a look-up pointer 36 for appropriate display label (INDEX) in the display table llok-up table 38 with the so-looked up label used to address the appropriate set of display-generating instructions (INDEX) in the instruction table 40. These instructions then are provided to the display generator 42 which then provided the requested display (INDEX) on the cathode ray tube screen 18a. In addition, the indicia display generator 44 uses the formatted coordinate information to display a cross symbol "+" in the touched area. In this way, the system operator(s) will always be informed of the last target area touched on the touch-responsive panel 18b.

Figure 7:
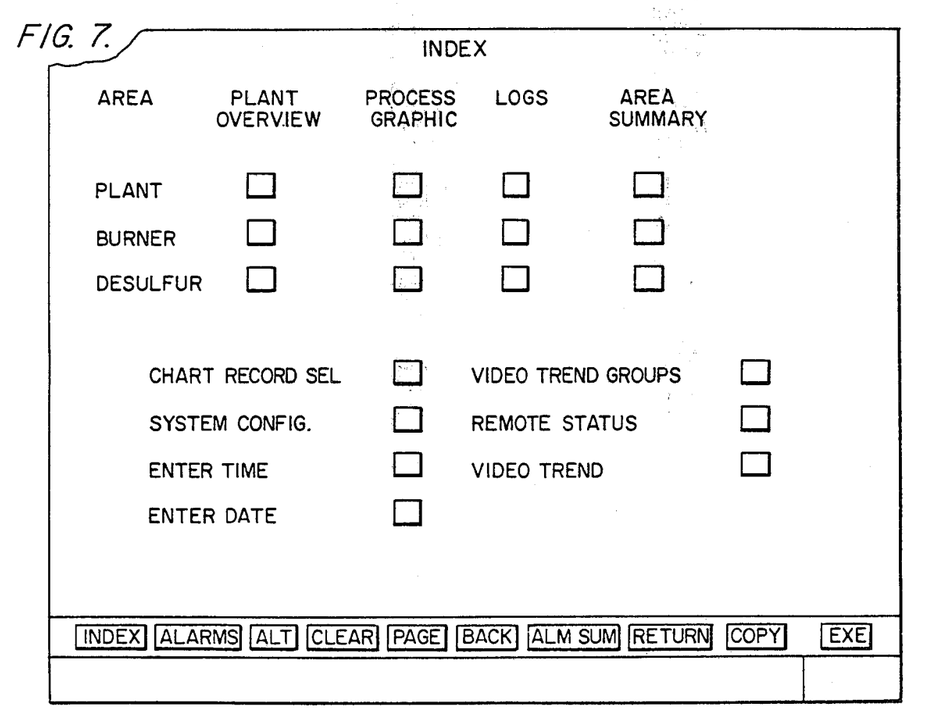
FIG. 7 is a pictorial representation of an exemplary task specific "INDEX" display.
Figure 8:
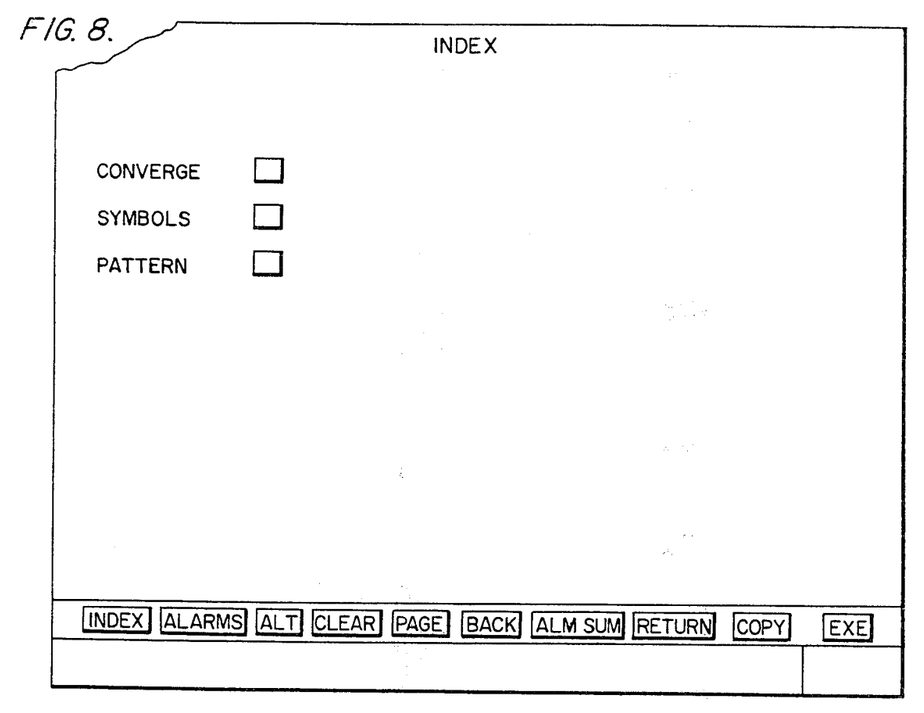
FIG. 8 is a pictorial representation of a second page of the "INDEX" display of FIG. 7.

The first page of the 'index' file called-up in response to touching the "INDEX"target of the global display is shown in FIG. 7 and, as shown therein, includes a plurality of labelled target rectangles. An exemplary second page of the 'index' file is shown in FIG. 8 and, as in the case of the first page shown in FIG. 7, also includes a plurality of labelled target rectangles. The second page of the 'index' display is accessed by touching the "PAGE" target of the global display to cause the display to increment one page in the 'index' file. Preferably, the pages of the 'index' file, as well as the other display files discussed below, are looped end-to-start so that incrementing past the last page of the display will cause the display to go to the first page of the file.

As shown in FIG. 7, the lower portion of the 'index' display includes the following target areas: "CHART RECORDER SEL" which permits selective operation of the chart recorder 24 shown in FIG. 2 to provide a graphical record of the change in a selected parameter with respect to time, and a "SYSTEM CONFIG" target which calls-up the first page of a 'system configuration' file. The "ENTER TIME" and "ENTER DAY" target areas permit entry and updating of time and date data shown on the lower right-hand side of the displays of FIGS. 6-12. The time and date information is entered using a two-step entry procedure. For example, to enter or update the time, the "ENTER TIME" target is touched and the appropriate time information is entered through the conventional keyboard 26 (FIG. 2) and thereafter the return key of the keyboard is depressed to effect entry of the time information. In a similar manner, the date information is entered. The "VIDEO TREND" and "VIDEO TREND GROUP" target areas call-up historical information in graphical form from these files while the "REMOTE STATUS" target area calls-up the 'remote status' file with information as to the various remote devices and their respective device controllers. The upper portion of the first page of the 'index' file includes target areas that permit the system operator to select specific files relating to the controlled process (in this case, a system for desulfurizing fuel oil). The operator may select the first page of a 'plant overview' file, a 'process graphic' file, a 'log' file, and a 'area summary' file for various portions of the specific process including the "PLANT," the "BURNER," and the "DESULFUR" portion of the process.

Figure 5:
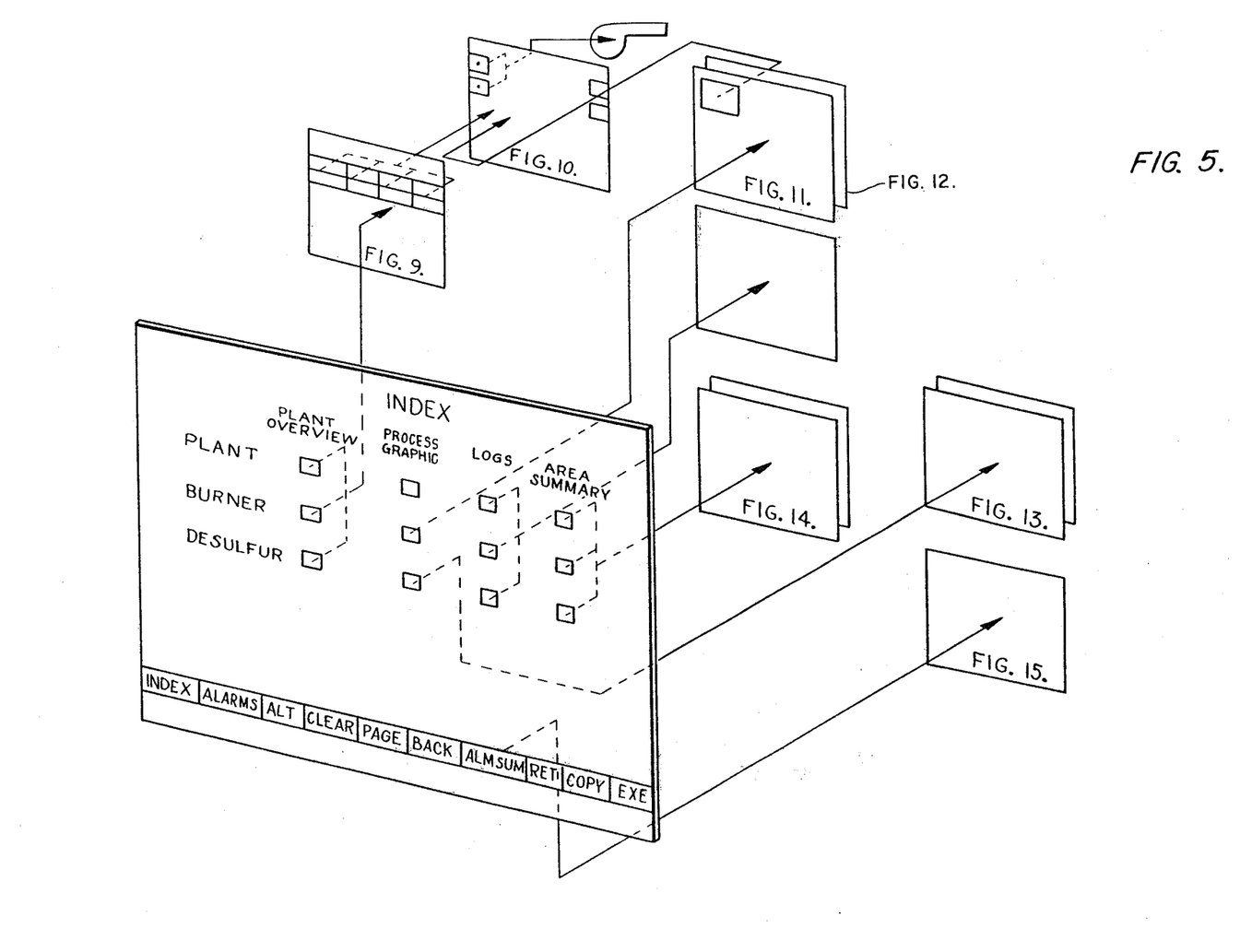
FIG. 5 is a pictorial map, in perspective, keyed to FIGS. 7-12 showing the displays obtained in response to touching of selected target areas of the "INDEX" display of FIG. 7.

A description of all of the files available through the first and second pages of the INDEX display of FIGS. 7 and 8 is not necessary to a full understanding of the present invention, and, accordingly, a description and discussion of only some of the files is provided with this selected description being sufficient to provide an understanding of the present invention. The relationship of the various display files described below to the target areas of the first page of the 'index' file may be best appreciated by a consideration of the display map shown in FIG. 5. The touching of the "PLANT OVERVIEW" target for either the "PLANT," the "BURNER," or the "DESULFUR" portion of the process will bring up the first page of the so-requested file with the display having the format shown in FIG. 9. This display includes a plurality (e.g. four) of labelled rectangles each of which include a plurality of bar graphs (G1–G8) distributed along a horizontal line in each rectangle. The various bar graphs (G1–G8) in each of the labelled rectangles represent a selected parameter including an analog parameter (e.g., the deviation of a measured value from a set point or the relative position of an adjustable controlled device) or a digital parameter (e.g., the open or closed position of a valve). Preferably the bar graphs G1–G8 are colored differently from one another, and, if desired displayed at different brightness levels. Also the display brightness of some of the bar graphs, viz., those that are in an alarm condition, can cycle between two different brightness levels to provide a blinking or flashing effect.

Figure 9:
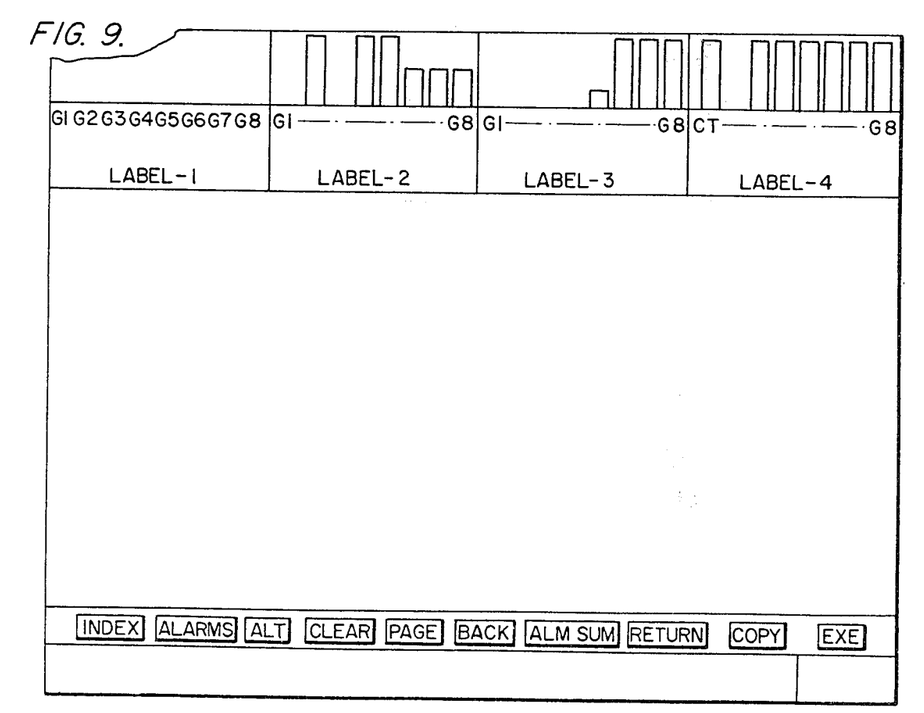
FIG. 9 is a pictorial representation of an exemplary "PROCESS OVERVIEW" task specific display.

Each of the labelled rectangles of FIG. 9 constitutes a target area for calling up another display. Thus, if the system operators(s) requires additional information regarding the parameters of one of the "LABEL-2" bar-graph target rectangles of FIG. 9, he merely touches that bar-graph rectangle to call-up the appropriate 'process control' file having the format shown in FIG. 10.

Figure 10:
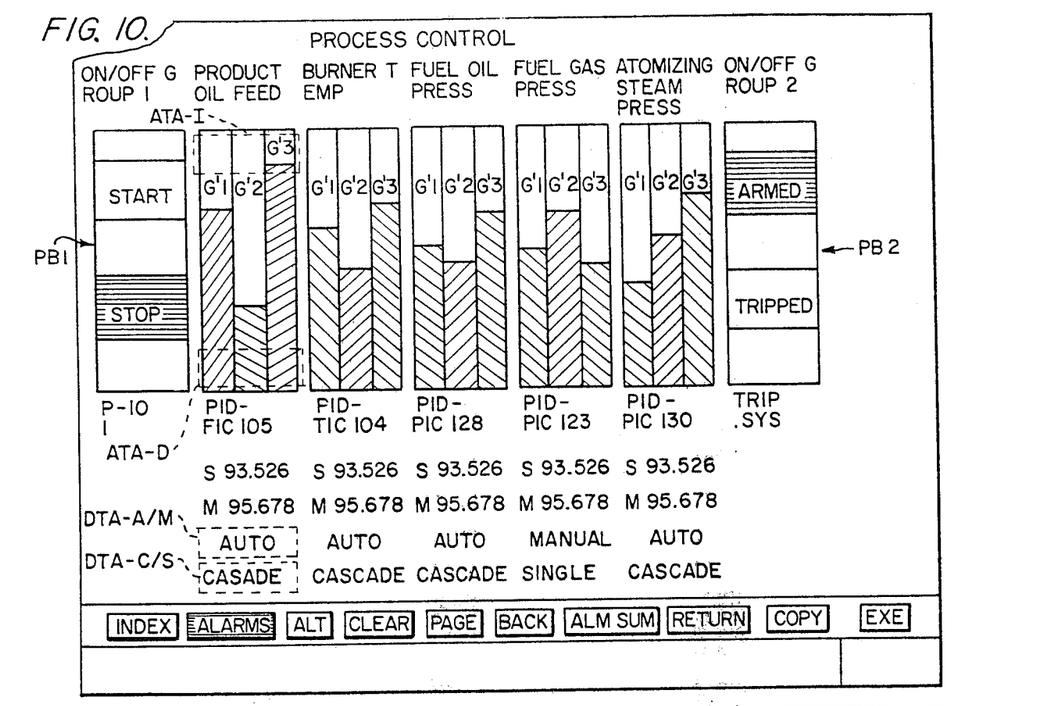
FIG. 10 is a pictorial representation of an exemplary "PROCESS CONTROL" task specific display.

The 'process control' file of FIG. 10 includes five sets of vertically aligned and labelled bar graphs with each set including three individual bar graphs G'1-G'3 in a side-by-side relationship. In addition, two push-button target areas are provided on each side of the bar graph sets with the left-hand push button area PB1 representing ON/OFF control and the right-hand push button area PB2 representing a system safety control including an "ARMED" target area and a "TRIPPED" target area. The bar graph sets of FIG. 10 each represent the output of a control loop. In the representative bar graph groups of FIG. 10, each left-hand bar graph G'1 represents the magnitude of the measured value of a selected parameter, the intermediate bar graph G'2 represents the magnitude of the desired set point for that measured parameter, and the right-hand bar graph represents the operative position of an associated controller device. For example, the right-hand bar graph G'3 can represent the analog position of a valve as a function of the height of the bar graph G'3. Beneath the various bar graph sets of FIG. 10, various control information is provided including quantitative alpha-numeric information as to the set point and measured value of a parameter and an indication of the status of the respective PID (Proportional-Integral-Differential) control loop, that is, whether or not the associated PID loop is under the control of the system operator (e.g. manual control indications) or responsive to the output of another loop (e.g. cascade indications).

Figure 16:
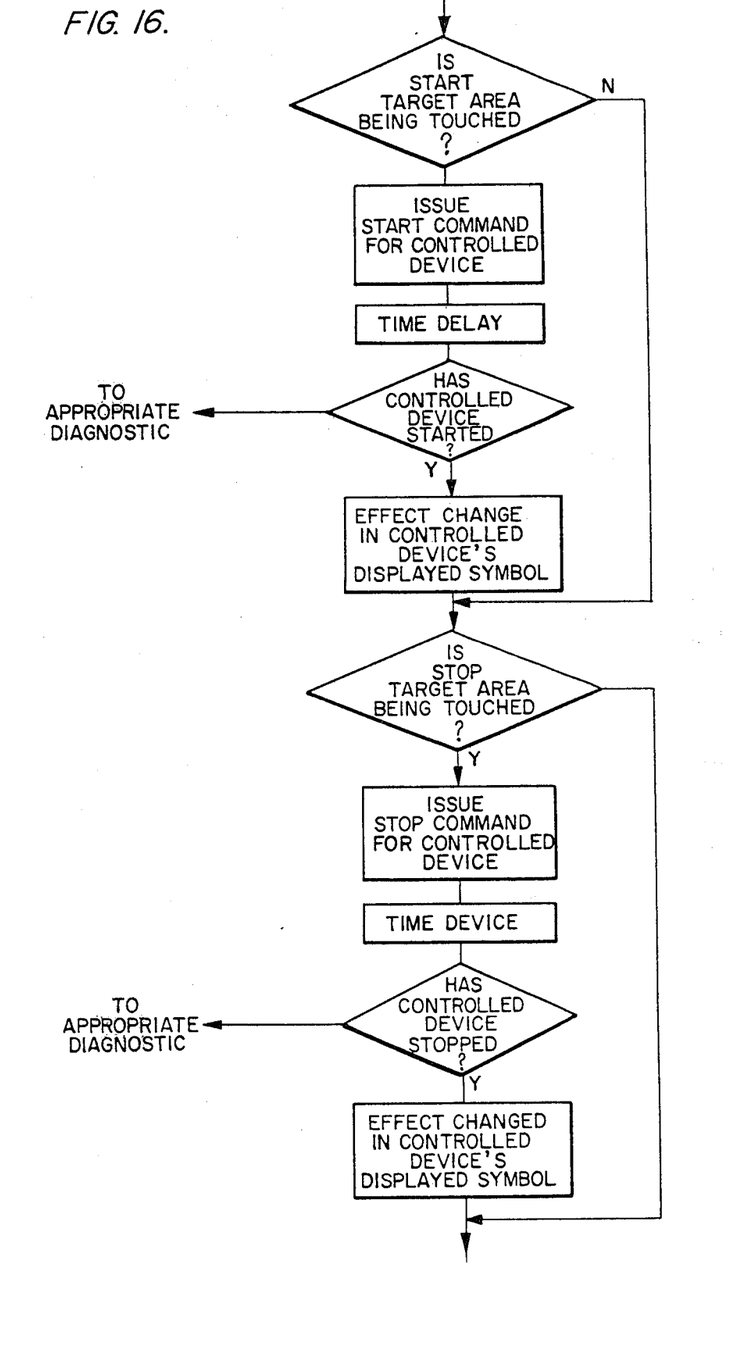
FIG. 16 is a flow diagram representing an instruction set for entering digital-type commands.
Figure 17:
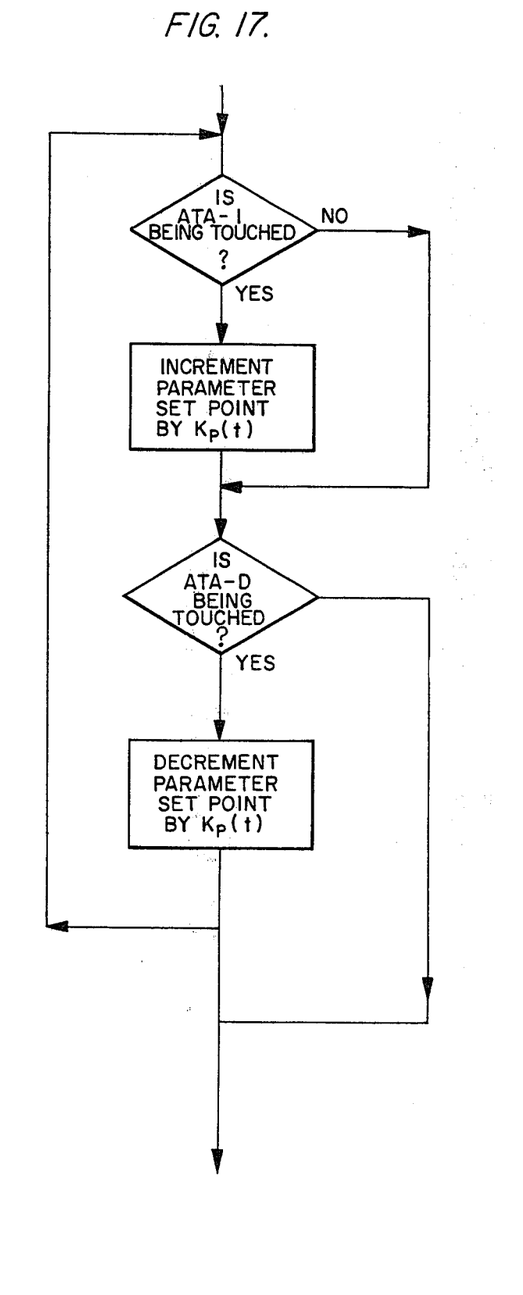
FIG. 17 is a flow diagram representing an instruction set for entering analog-type commands for incrementing or decrementing an analog set point.

The touch-responsive panel 18b and the 'process control' display of FIG. 10 can be used to effect entry of commands of both a digital and analog nature. For example, digital-type commands may be entered by touching the "START" target rectangle on the left-hand side of the display of FIG. 10. Appropriate coordinate (X,Y) information in formatted form is presented to the processor 30 (FIG. 4) which then evaluates the coordinate information to generate an appropriate START-command. Thereafter, the "EXE" target is touched to provide the actual START control signal to the appropriate controlled device (e.g. a pump). In a like manner, touching the STOP rectangle causes a STOP command to be generated with subsequent touching of the "EXE" target causing the STOP control signal to be provided to the controlled device. When the controlled device responds to the control signal (i.e., by STARTING or STOPPING) that response then causes the appropriately touched target rectangle to change to indicate the controlled device's response. Such changes may include, e.g., changes in illumination intensity, color, or the like, to indicate the correct "ON" or "OFF" status. An exemplary flow diagram representing an instruction set for effecting the above described start/stop digital-type command signal entry and subsequent change in the controlled device's displayed symbol is shown in FIG. 16. In a similar manner, the safety-system "ARMED" and "TRIPPED" targets shown in the right-hand side of FIG. 10 can be actuated to also cause digital-type command entries. In order to enter analog-type commands, such as changing the set point of selected parameter for one of the loops, the upper portion of the appropriate bar graph set or the other designated area, for example, the area ATA-I (Analog Target Area-Increment) shown in the dotted line illustration in FIG. 10 is touched. The coordinate information in formatted form is provided to the processor 30 (FIG. 4) which then continuously increases the set point toward a maximum value for as long as the target area ATA-I is touched. For example, briefly touching the ATA-I area of the set point bar graph G'2 will cause that set point to increase a small amount, and touching the same target area ATA-I for a longer period of time will cause the set point to increase proportionally. The change in the set point will then cause a resultant increase in the vertical height of the set point bar graph G'2. Conversely, the set point may be lowered by touching a designated area ATA-D (Analog Target Area-Decrement) as shown in dashed line below the set point bar graph G'2 with the set point being continuously lowered toward a minimum value for as long as the area ATA-D is touched. The change in the set point will then cause a resultant decrease in the vertical height of the set point bar graph G'2. As can be appreciated, the set point may be raised and lowered in a very simple manner by merely touching, for the required amount of time, the appropriate target area ATA-I or ATA-D with the requested change in the set point being visually displayed to the system operator by the associated graph G'2 and the change in the measured value thereafter being indicated by the associated graph G'1. An exemplary flow diagram representing an instruction set for effecting the above described increment/decrement analog-type command signal entry and the subsequent change in the set point is shown in FIG. 17. As can be appreciated by those skilled in the art, it is not necessary, as in the case of prior art systems, to manually enter alpha-numeric mnemonics identifying particular set points to be changed and then entering the new set point data. The display of FIG. 10 also includes, as shown therein, selected numerical information relating to the controlled loop and other information indicating the particular mode the loop is operating in, as explained below.

The display of FIG. 10 is also used by the system operator(s) to change the overall control loop configuration. Each of the PID loops may be placed in one of several operating modes including a 'cascade' or 'single' mode and a 'manual' or 'auto' mode. While a detailed understanding of the operation of each mode is not essential to an understanding of the present invention, the 'cascade' mode permits a loop to receive, as its input, the output of another PID loop, while the 'single' mode permits that same loop to operate in response to a predetermined set point, and the 'manual' mode permits the loop to operate as an open-loop follower without loop control, while the 'auto' mode permits that same loop to operate as a closed loop. A particular PID loop can be switched between the 'cascade' and 'single' modes by touching the target area DTA-C/S (Digital Target Area-Cascade/Single) shown in dotted line illustration below the appropriate bar graphs. A small hit indicia "+" will then be displayed in the touched target area and, if desired, the brightness of the touched DTA-C/S target area can be made to cyclically vary between two brightness levels to provide a flashing or blinking effect. Thereafter, the operator touches the "EXE" target of the global display to enter the command. In response thereto, the selected PID loop is then changed from its present mode (e.g., the 'cascade' mode) to the other available mode (e.g., the 'single' mode). In a like manner, the system operator can switch a selected PID loop between the 'manual' and 'auto' modes by touching the DTA-M/A (Digital Target Area-Manual/Auto) under the appropriate bar graph set. A hit indicia (+) will then be displayed in the touched target area and thereafter, the operator touches the "EXE" target of the global display to enter the command; the selected PID loop being then placed in the desired mode (e.g., manual or auto).

As can be appreciated from the foregoing description, touching a "PLANT OVERVIEW" target area of the 'index' display of FIG. 7 calls-up the display of FIG. 9 which, in turn, permits the call-up of the 'process control' display of FIG. 10 which then permits both digital and analog entry to effect process control changes with the so-requested change being displayed on the CRT display screen 18a.

In a manner similar to the function of the "PLANT OVERVIEW" target area described, above, the "PROCESS GRAPHIC" target areas of the 'index' display of FIG. 7 will call-up graphical representations of the process. For example, touching the "PROCESS GRAPHIC" target area for the "DESULFUR" portion of the 'index' display will call-up the first page of a graphic display file as shown in FIG. 11 with the second page of the file (FIG. 12) available for display by touching the "PAGE" target area of the global display.

Figure 11:
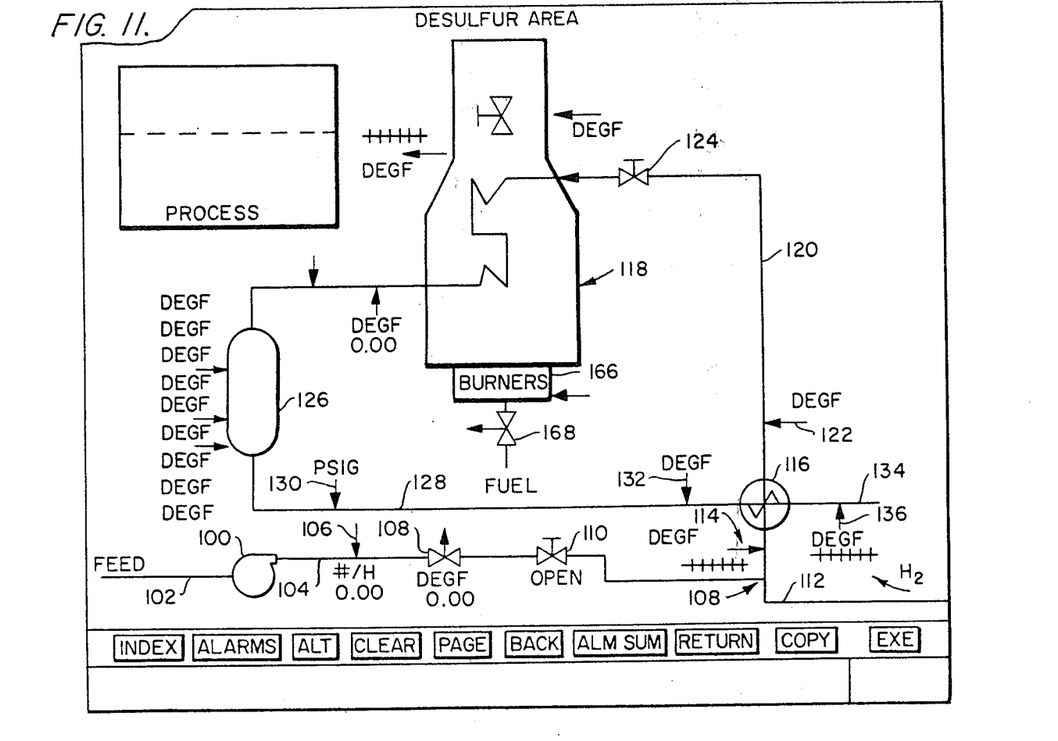
FIG. 11 is a pictorial representation of an exemplary "PROCESS GRAPHIC" task specific display for a process for removing sulfur from a feed fuel oil.
Figure 12:
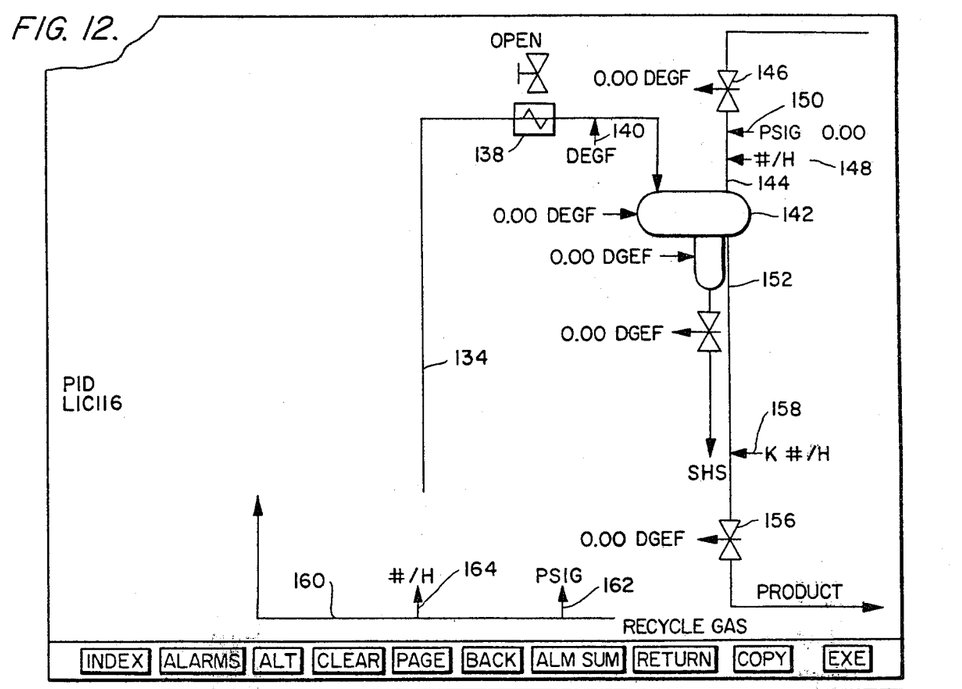
FIG. 12 is a pictorial representation of a second page of the "PROCESS GRAPHIC" display of FIG. 11.

The exemplary process shown in FIGS. 11 and 12 removes sulfur from input fuel oil by mixing the fuel oil with hydrogen gas, heating the fuel oil and hydrogen mixture, and then passing the so-heated mixture over a catalyst bed where the hydrogen combines with the sulfur in the fuel oil to form hydrogen sulfide gas and the desired desulfured fuel oil. As shown in FIG. 11, the controlled devices for effecting the desulfurization of the fuel oil include a feed pump 100 which receives fuel oil from an input line 102 and delivers the fuel oil under pressure along line 104 through a flow meter 106, a flow control valve 108, and a safety valve 110. Hydrogen gas is provided along line 112 and is mixed with the feed oil at junction 108. The temperature of the gas/oil mixture is measured by sensor 114 and the mixture passed through a heat exchanger 116 where the mixture is preheated and then passed into a main heater 118 through line 120 that includes a thermal sensor 122 and a control valve 124. The heated mixture is passed to a catalyst bed 126 which contains a catalyst that causes the hydrogen gas to react with sulfur contained in the fuel oil to form hydrogen sulfide gas and desulfured feed oil. This mixture is then provided along outlet line 128 past pressure sensor 130 and temperature sensor 132 to the heat exchanger 116 where heat energy from the mixture is provided to the incoming fuel oil and hydrogen gas mixture. The somewhat cooler mixture is then conducted along line 134 past temperature sensor 136 to the apparatus shown on the second page of the 'process graphic' display. As described above, the second page of the 'process graphic' display (FIG. 12) is called-up by touching the "PAGE" target area of the global display. As shown in FIG. 12, the fuel oil mixture is passed to another heat exchanger 138 where additional heat energy is removed and past a temperature sensor 140 to a gas/liquid separator 142. In the separator 142, the hydrogen sulfide gas is removed along line 144 through valve 146 with its flow rate and pressure being measured at 148 and 150. The desulfured fuel oil is removed along discharge line 152 through valve 156 with the flow rate being measured at 158. Also shown in FIG. 12, a line 160 with pressure and flow rate sensors 162 and 164 is provided through which recycled process gas is provided to the burners 166 of the heater 118 (FIG. 11) with the flow being controlled at valve 168.

A bar graph rectangle is shown in the upper left-hand side of FIG. 11 and illustrates various parameters in bar graph form for the process shown in the remaining portion of FIG. 11. The bar graph area is also a target area and, when touched, will call-up the display of FIG. 10 to permit the system operator to effect control changes within the system as described above.

Figure 13:
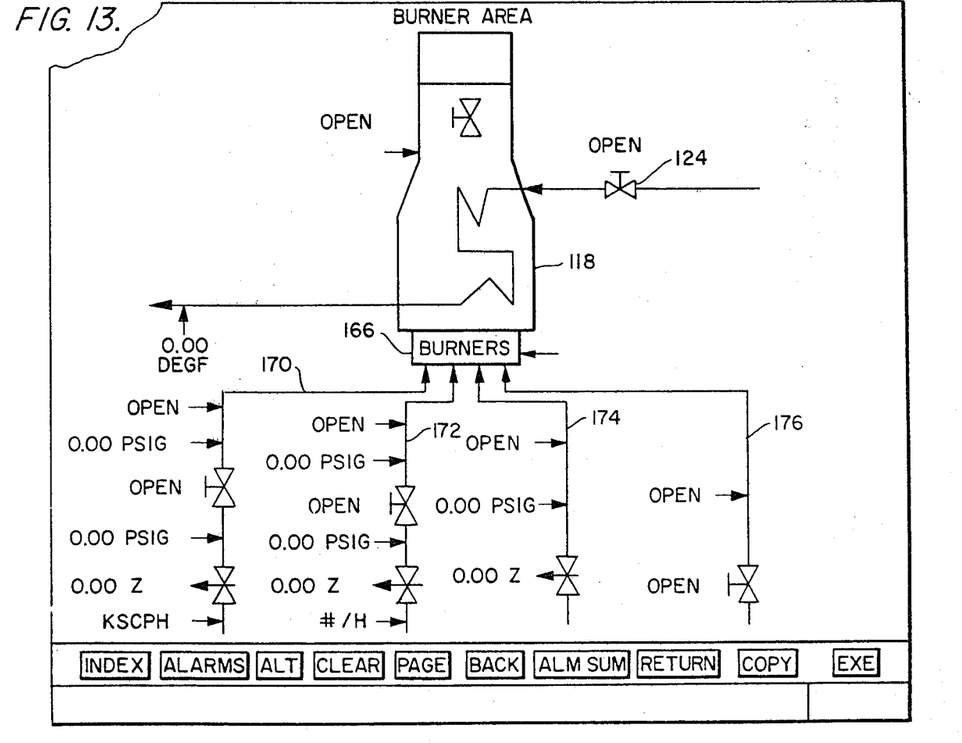
FIG. 13 is a pictorial representation of an exemplary "BURNER AREA" task specific display.
Figure 14:
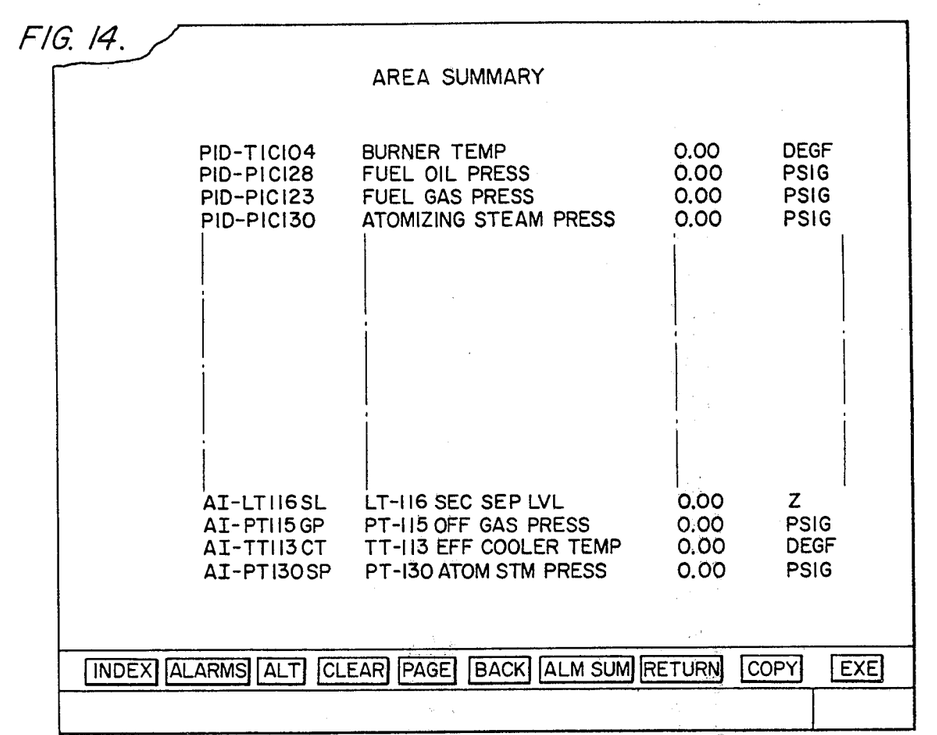
FIG. 14 is a pictorial representation of an exemplary "AREA SUMMARY" display.

The operation of the burner area of FIG. 11 may be shown in greater detail by depressing the appropriate process graphic target area for the burner on the index page to provide the display shown in FIG. 13. The 'burner' display includes the burners 166 which selectively receive fuel gas along line 170, fuel oil along line 172, pressurized steam along line 174, and fuel for the burner pilot along line 176. The fuel lines 170 and 172 both include control valving and pressure and temperature sensors that provide inputs to the associated PID loops. The 'process control' display of FIG. 10 directly corresponds with the process graphics of FIGS. 11-13. More specifically, the push button control area PB1 on the left-hand side of FIG. 10 controls the operation of the feed pump 100 of FIG. 11 with the three-bar graph set of FIG. 10 labelled 'product oil feed' indicating the flow rate of the feed oil through line 104 in relation to the desired set point. The three-bar graph set of FIG. 10 labelled 'burner temperature' illustrates the measured temperature of the burners 166 of FIGS. 11 and 12 in relationship to their desired set point. The two three-bar graph sets labelled 'fuel oil pressure' and 'fuel gas pressure' graphically illustrate the measured and set point values for the fuel in lines 170 and 172, respectively, of FIG. 13 while the three-bar graph set labelled 'atomization steam pressure' indicates the pressure of the steam in line 174. As is known in the art, pressurized steam is introduced with fuel oil to assist in atomizing the fuel oil. In the normal operation of the burners 166, fuel gas is a preferred fuel with fuel oil and associated steam being used when desired or when dictated by operating circumstances. As can be appreciated, commands inputted to the appropriate target areas of FIG. 10 directly control the various control devices discussed above in connection with FIGS. 11-13.

The "LOG" target areas of the 'index' file (FIG. 7) for the "PLANT," "BURNER," and "DESULFUR" portions of the process provide a time-tagged listing of events in the process. While a 'log' display has not been illustrated in the figures, a typical 'log' display would include a listing of command changes and other events along with the time and date that these changes or events occurred. If desired, a cumulative log can be printed on the printer 22 (FIG. 2) at periodic intervals, e.g., every hour-on-the-hour to provide an historical record of process.

The "AREA SUMMARY" target area of the 'index' file (FIG. 2) calls-up a display with a current status information of various of the control loops and other parameters. An exemplary 'area summary' display shown in FIG. 15 and as shown therein includes an alpha-numeric identifier for the control loop or parameter, a short explanatory title, the quantitative value, and the associated units.

Figure 15:
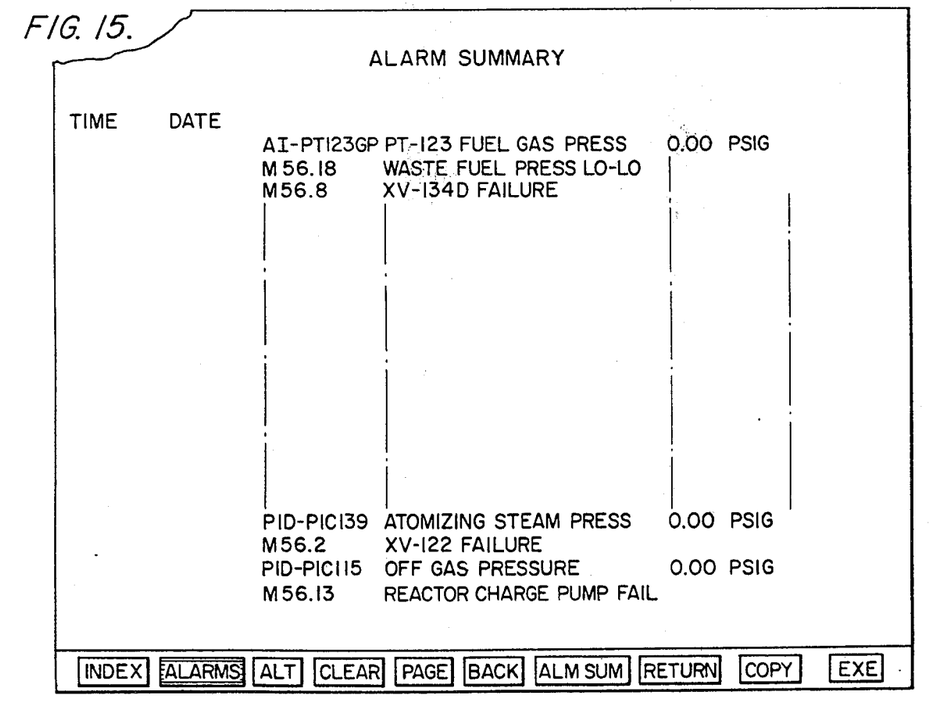
FIG. 15 is a pictorial representation of an exemplary "ALARM SUMMARY" display.

The "ALARM SUMMARY" target area of the global display (FIG. 7) is used to call-up a listing of those parameters or control loop outputs that are or have been in an alarm condition (that is, the measured value is either above or below a predetermined alarm limit). An exemplary 'alarm summary' display is shown in FIG. 15 and includes time and date information to indicate when the particular parameter entered the alarm condition, an alpha-numeric identifier, a short explanatory title, the quantitative value, and the associated units. Those particular parameters that are in alarm condition in the display of FIG. 15 may be highlighted for the operator's attention by varying their brightness level between two values to provide a blinking or flashing effect. If the system operator wishes to acknowledge those parameters in alarm condition, he may touch the "ALARMS" target area of the global display to acknowledge the alarms and to cause the blinking or flashing to stop. In this way, the operator, by periodically acknowledging alarms, can identify those parameters which most recently enter the alarm condition.

The "ALT" target of the global display controls the display shown on the alternate display device 20 (FIG. 2). For example, touching the "ALT" target area and then touching the "COPY" target area will cause the printer 22 (FIG. 2) to provide a hard copy of the display shown on the alternate display device 20. Also, touching the "ALT" target area followed by touching the target areas "CLEAR," "PAGE," or "BACK" would cause these functional responses to take place on the alternate display. Thus, by use of the "ALT" target, different displays can be called up for the visual display device 18a and the alternate display 20.

The preferred embodiment of the industrial process described above is merely exemplary of a wide variety of industrial processes to which the industrial control system of the present invention can be applied. As can be appreciated from the above, an industrial process control system in accordance with present invention permits a system operator to effect quick and accurate control of an entire system by merely touching the appropriate area on a visual display screen. The controlled devices of the system and parameters are graphically and symbolically displayed on the screen and the command input device is spatially juxtaposed with the displayed symbols so that command inputs, including command inputs of both an analog and digital nature, can be easily and quickly entered into the system.

As will be apparent to those skilled in the art, various changes and modifications may be made to the present invention without departing from the spirit and scope of the invention as recited in the appended claims and their legal equivalent.

What is claimed is:

1. A control system for controlling an industrial process, said system comprising:

a plurality of controlled devices and associated device controllers for effecting control of process parameters, said controlled devices and associated device controllers interconnected through a communications link means to a control interface, said interface including a visual display means having a visual display surface associated therewith and means for generating symbols displayed simultaneously thereon representative of different process parameters of the system, said symbols each having a displayed analog characteristic representing the value of an associated process parameter;

a touch-responsive means overlying said display surface and through which said symbols are visible;

means for detecting the touching of selected target areas on said touch-responsive means corresponding to said displayed symbols, said target areas including a first area located at each symbol for incrementing the associated parameter and a second area located at each symbol separate from said first area for decrementing the associated parameter; and means for generating a signal in response to the touching of said first area and another signal in response to the touching of said second area, said first signal effective to increment the associated process parameter and the second signal effective to decrement the associated process parameter, the change in said process parameter causing a change in the analog characteristic of the corresponding displayed symbol on said visual display surface.

2. A control system for controlling an industrial process sytsem, including:

a plurality of controlled devices and associated device controllers for effecting control of process parameters, said controlled devices and associated device controllers interconnected through a communications link means to a control interface, said interface including a visual display means having a visual display surface associated therewith and means for generating symbols thereon representative of the system process parameters;

a touch-responsive means overlying said display surface and through which said symbols are visible and means for detecting the touching of selected surface areas on said touch-responsive means corresponding to a selected displayed symbol representing an associated parameter, said selected areas including at least a first area for incrementing the associated parameter and at least a second area for decrementing the associated parameter;

means for generating a first signal in response to touching the first area and a second signal in response to touching the second area, said first and second signals varying as a function of the time that said first or second respective area is touched, said first signal effective to increment the associated process parameter as a function of the time that the first area is touched and said second signal effective to decrement the associated process parameter as a function of the time that the second area is touched;

the change in the process parameter in response to said signals causing a change in said selected display symbol on said display screen;

said first and second areas being linearly displaced from one another along a line, said symbol being displayed linearly therebetween and increasing lengthwise in response to said first signal and decreasing lengthwise in response to said second signal.

3. A control system for controlling an industrial process, said control system comprising:

a plurality of controlled devices and associated device controllers for effecting control of said controlled devices, said controlled device being proportionally operable through an operating range between first and second operating states;

said controlled devices and associated device controllers interconnected through a communications link means to a control interface, said interface including a visual display means having a visual display surface associated therewith and means for simultaneously generating symbols on said display surface representative of said controlled devices said symbols each including a displayed analog characteristic representing the proportional state of the controlled device represented thereby;

a touch-responsive means overlying said display surface and through which said display symbols are visible;

means for detecting the touching of selected areas of said touch-responsive means corresponding to displayed symbols on said visual display surface including at least one first area located at each symbol and at least one second area located at each symbol;

means for generating a first control signal in response to the touching of said first area and for generating a second control signal in response to the touching of said second area, said first control signal effective to cause the controlled device represented by the corresponding symbol to move toward said first operating state and said second control signal effective to cause the controlled device represented by the corresponding symbol to move toward said second operating state, the response of the controlled device being displayed on said visual display screen as the analog characteristic of the corresponding symbol.

4. A control system for controlling an industrial process as claimed in claim 3 wherein;

said means for generating said control signals generates control signals proportional to the time that a selected area is touched.

5. A control system for controlling an industrial process as claimed in claim 3 wherein the first area and the second area located at each symbol are linearly displaced from one another along a line, the corresponding symbol being displayed linearly therebetween and increasing lengthwise in response to said first control signal and decreasing lengthwise in response to said second control signal.

6. A control system as claimed in claim 3 wherein said at least one of said controlled devices controls a process parameter in accordance with a set point applied to the associated device controller, the displayed symbol representing said at least one of said controller devices including a second displayed analog characteristic representing the value of said process parameter and a third displayed analog characteristic representing the set point applied to the associated device controller.

* * * * *